United States Patent [19]

Franaszek et al.

[11] Patent Number: 4,952,930
[45] Date of Patent: Aug. 28, 1990

[54] MULTIPATH HIERARCHICAL NETWORK

[75] Inventors: Peter A. Franaszek, Katanoh; Christos J. Georgiou, White Plains, both of N.Y.

[73] Assignee: International Business Machines Corp., Armonk, N.Y.

[21] Appl. No.: 274,101

[22] Filed: Nov. 18, 1988

[51] Int. Cl.$^5$ .............................................. H04Q 1/00
[52] U.S. Cl. ......................... 340/825.800; 340/825.01; 340/825.02; 340/827
[58] Field of Search ...................... 340/825.01, 825.02, 340/825.03, 826, 827, 825.79, 825.8; 370/16, 58, 60, 61; 379/272, 273, 274, 271, 279

[56] References Cited

U.S. PATENT DOCUMENTS

| | | | |
|---|---|---|---|
| 4,455,645 | 6/1984 | Mijioka et al. | 370/16 |
| 4,536,870 | 8/1985 | Bovo et al. | 370/16 |
| 4,630,259 | 12/1986 | Larson et al. | 370/60 |
| 4,635,250 | 1/1987 | Georgiou | 370/58 |
| 4,654,842 | 3/1987 | Coraluppi et al. | 340/825.8 |
| 4,701,756 | 10/1987 | Burr | 370/60 |
| 4,752,777 | 6/1988 | Franaszek | 340/825.79 |
| 4,811,333 | 3/1989 | Rees | 340/825.8 |
| 4,814,762 | 3/1989 | Franaszek | 340/825.79 |

FOREIGN PATENT DOCUMENTS 2128445 4/1984 United Kingdom ................. 340/827

OTHER PUBLICATIONS

Dias et al., "Analysis and Simulation of Buffered Delta Networks", IEEE Transactions on Computers, vol. C-30, No. 4, Apr. 1981.
Patel, "Performance of Processor-Memory Interconnections for Multiprocessors", IEEE Transactions on Computers, vol. C-30, No. 10, Oct. 1981.
Gottlieb, "The NYU Ultracomputer-Designing an MIMD Stared Memory Parallel Computer", IEEE Transactions on Computers, vol. C-32, No. 2, Feb. 1983.
Franaszek, "Path Hierarchies in Interconnection Networks", IBM Journal of Research and Development, vol. 31, No. 1, Jan. 1987.
Thurber, "Circuit Switching Technology: A State-of-the-Art Survey", Seventeenth IEEE Computer Society International Conference, 10-1978, pp. 116-124.

Primary Examiner—Donald J. Yusko
Assistant Examiner—Edwin C. Holloway, II
Attorney, Agent, or Firm—Whitham & Marhoefer

[57] ABSTRACT

A hierarchy of multipath networks selectively provides connections between a plurality of sources and a plurality of destinations in a communications system. The hierarchy comprises a first multipath network without buffering which consists of two or more stages and constituting a fast path for connecting a source to a destination. At least a second multipath network with buffering and comprising a plurality of stages constitutes an alternate, slower path for connecting a source to a destination in the event that a connection between the source and the destination is blocked in the fast path. The address field of a message from a source is examined at each stage to select an appropriate connection to the next stage and, if the connection is available, the message, stripped of the address field, is propagated to the second stage, but if the next stage is blocked, the message is stopped and a negative acknowledgment is returned to the source. Retransmission of the message through the second network of the hierarchy is initiated upon the receipt of a negative acknowledgment at the source. The concept may be extended to multiple levels, with only the last stage providing buffering.

10 Claims, 5 Drawing Sheets

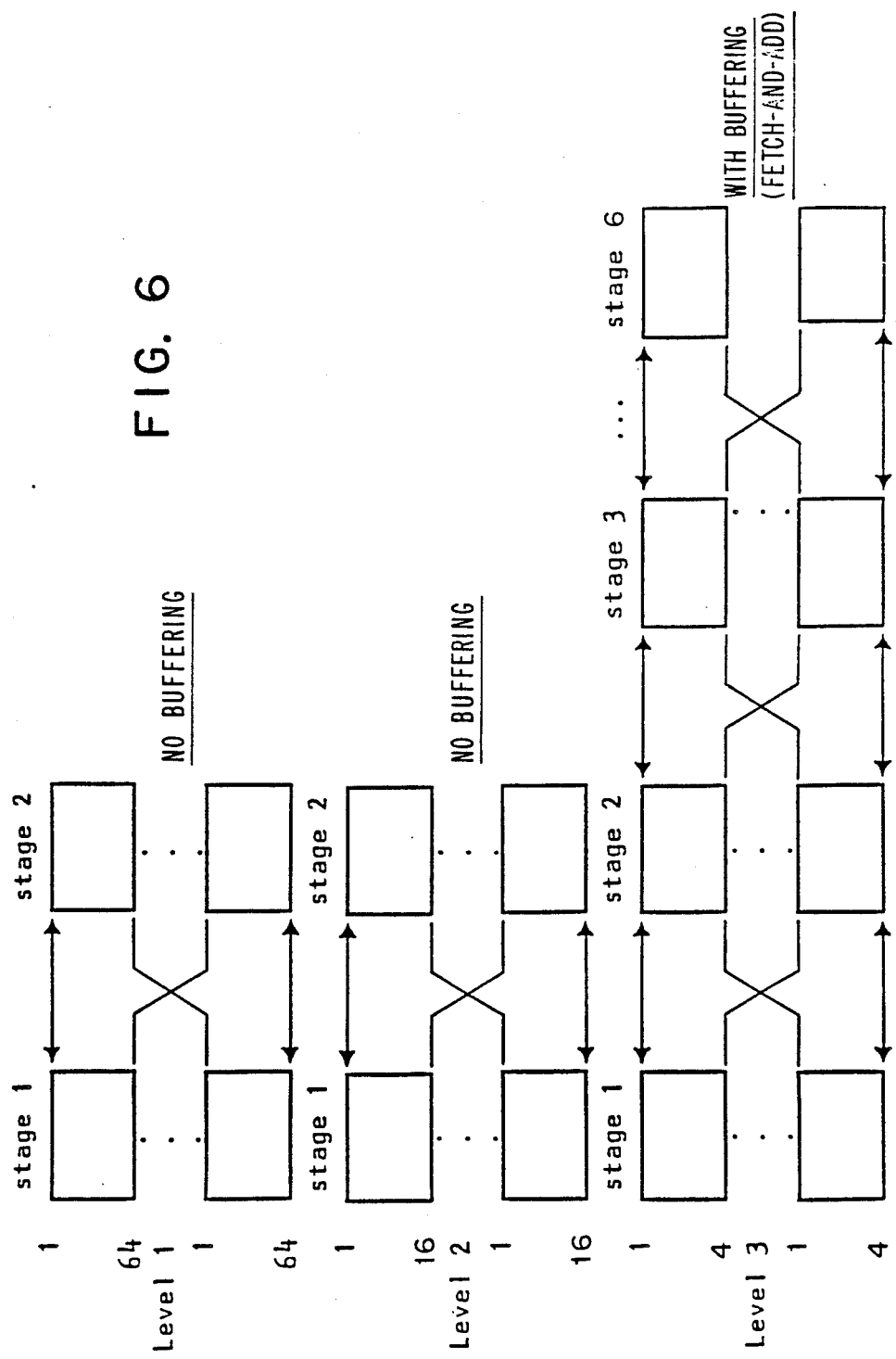

MULTIPATH HIERARCHICAL NETWORK

CROSS-REFERENCE TO RELATED APPLICATION

The disclosure of this application is related in subject matter to copending application Ser. No. 07/125,088 filed Nov. 25, 1987, now U.S. Pat. No. 4,814,762 to Peter A. Franaszek for 'Delta Network Control of a Cross-Point Switch' a division of Ser. No. 07/048,982 filed May 12, 1987, now U.S. Pat. No. 4,752,777 to Peter A. Franaszek for "Delta Network of a Cross-Point Switch" and assigned to the assignee of this application. The disclosure of application Ser. No. 07/125,088 is incorporated herein by reference.

BACKGROUND OF THE INVENTION

1. Field of the Invention

The present invention generally relates to interconnection systems wherein a large number of sources are selectively connected to a large number of destinations. A specific application of such an interconnection system is in a shared-memory computer system. More particularly, the invention is directed to a multipath network hierarchy having two or more levels of multistage networks with different message transfer latencies.

2. Description of the Prior Art

Prior art shared-memory systems having large number of processors are typically interconnected with a multistage network. By a large number of processors, what is meant is a number of processors of, say, on the order of 256 or greater. In at least one example of a high performance multiprocessor system, the network was built with a technology ten times faster than the technology of the processors in order to overcome the transfer delays which are inherent in a multistage network architecture. The performance limitations of multistage networks have led to the invention of hierarchical networks as disclosed, for example, in U.S. Pat. No. 4,752,777 to Franaszek and copending application Ser. No. 07/125,088 and described in an article entitled "Path Hierarchies in Interconnection Networks" by Peter A. Franaszek published in the *IBM Journal of Research and Development*, vol. 31, no. 1, Jan. 1987, pp. 120–131.

The operation of a hierarchical network is analogous to that of a storage hierarchy, whose average performance in a good design is largely determined by the speed of the fastest component. The path hierarchy described in U.S. Pat. No. 4,752,777 has only two levels, the top level or fast path being provided by a crossbar switch. Path hierarchies, however, need not necessarily be limited to two levels or include a crossbar switch. If, for example, a network hierarchy is configured with multiple levels of multistage networks, each one with different message transfer latencies, significant cost advantages could be achieved over a two level hierarchy with a crossbar switch. Furthermore, in cases where the number N of network nodes is very large, for example, where N is larger than 1000, the only type of hierarchy technology that could actually be realized under current technology would be one consisting of multistage networks only, given the hardware complexity of a crossbar switch, which grows quadratically with N.

SUMMARY OF THE INVENTION

It is therefore an object of this invention to provide a hierarchical network comprising multiple levels of multistage networks.

It is a further object of the invention to realize the potential cost advantages of a multistage interconnection system in a communications system having a very large number of nodes without the attendant transfer delays which have heretofore characterized such interconnection systems.

According to the invention, a network hierarchy is configured with multiple levels of multistage networks, each one with different message transfer latencies. As a specific example, a hierarchy of multipath networks selectively provides connections between a plurality of sources and a plurality of destinations in a communications systems. The hierarchy comprises a first multistage network without buffering which constitutes a fast path for connecting a source to a destination. At least a second network with buffering and comprising a plurality of stages constitutes an alternate, slower path for connecting a source to a destination in the event that a connection between the source and the destination is blocked in the fast path. In the fast path network, the address field of a message from a source is examined at each stage to select an appropriate connection to the next stage and, if the connection is available, the message is propagated to the second stage, but if the next stage is blocked, the message is stopped and a negative acknowledgment is returned to the source. Retransmission of the message through the second network of the hierarchy is initiated upon the receipt of a negative acknowledgment at the source. The concept may be extended to multiple levels, with only the last level providing buffering.

Because the fast path has minimal hardware complexity, a path connecting a source, destination pair will encounter few gate delays and chip crossings, so that the message propagation delay is very small. The blocking factor of this network, however, can be quite high. Thus, the second level in the hierarchy may be provided by a similar network (i.e., without buffering) but with a smaller blocking factor. Finally, the nth level (where n is three or greater) would be provided with store-and-forward networks which would guarantee delivery to the destination under all traffic conditions.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 6 is a block diagram illustrating how the basic network of FIG. 5 can be extended to levels greater than two.

DETAILED DESCRIPTION OF A PREFERRED EMBODIMENT OF THE INVENTION

Figure 1:
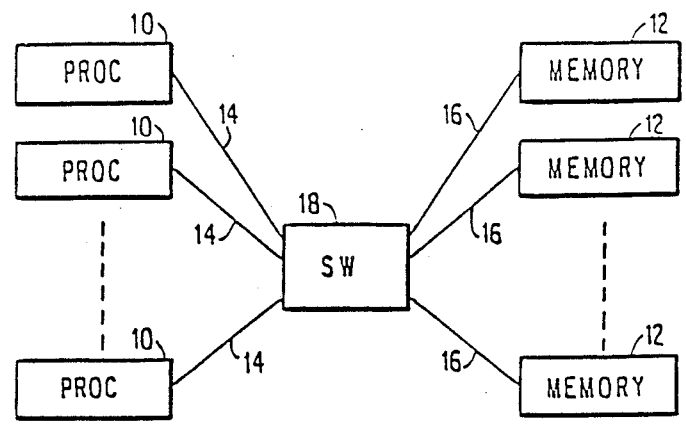
FIG. 1 is a block diagram providing a generalized illustration of a multi-port switching system.

Referring now to the drawings, and more particularly to FIG. 1, there is illustrated a computer system wherein a large number of processors 10, each operating independently and in parallel with each other, are provided with access to a similar large number of memory systems 12. Each processor has an input/output (I/O) path 14 and each memory system likewise has an I/O path 16. The paths 14 and 16 can be buses and may be duplicated to provide full-duplex communication. The important consideration, however, is that a processor 10, requiring access to a particular memory system 12, must have its I/O path 14 connected to the I/O path 16 of the required memory system 12. This selective connection is performed by a switching network 18.

The use of a cross-point switch for the switching network 18 provides the required high bandwidth. The important feature of a cross-point switch is that it can simultaneously provide N connections from one side to the other, each selectively made. Although the complexity of a cross-point switch increases as a quadratic function of N, the relative simplicity of the actual $N^2$ cross-points allows its fabrication in a currently available technology. See, for example, U.S. Pat. No. 4,635,250 to Georgiou for "Full Duplex One-Sided Cross-Point Switch".

An alternative to the cross-point switch is a multistage network, such as a Delta or Omega network. Considering by way of example Delta networks as a representative of the broader class of multistage networks, Delta networks are defined, with several examples provided, by Dias et al. in a technical article entitled "Analysis and Simulation of Buffered Delta Networks" published in the *IEEE Transactions on Computers*, vol. C-30, no. 4, April 1981, pp. 273-282. Patel also defines a Delta network in "Performance of Processor-Memory Interconnections for Multiprocessors" in the *IEEE Transactions on Computers*, vol. C-30, no. 10, Oct. 1981, pp. 771-780.

Figure 2:
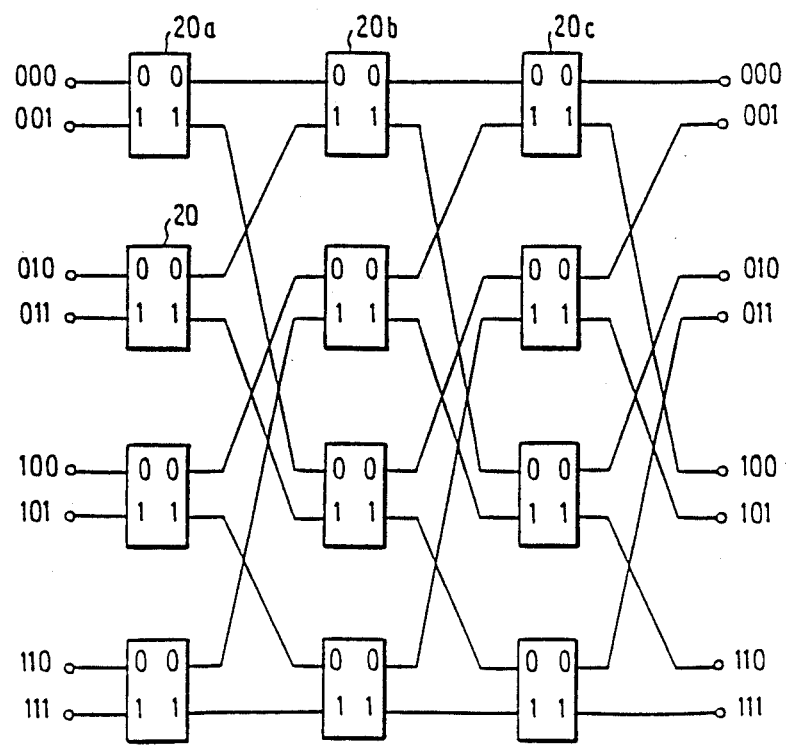
FIG. 2 is a block diagram illustrating a Delta network as one component of a hierarchical network.

The Delta network will be described here with reference to the Omega switching network, described by Gottlieb et al. In a technical article entitled "The NYU Ultracomputer—Designing an MIMD Shared Memory Parallel Computer" published in the *IEEE Transactions on Computers*, vol. C-32, no. 2, Feb. 1983, pp. 175-189. This example of a Delta network is illustrated in FIG. 2. There are eight ports on the left, identified by binary numbers, and eight ports on the right, likewise identified by binary numbers. Connecting the right hand and the left hand ports are three stages of switches 20. Each switch 20 is a 2×2 switch that can selectively connect one of the two inputs on one side to one of the two outputs on the other side. The Delta network can provide a connection from any port on the right hand side to any port on the left hand side and is intended to be used in a parallel pipelined fashion. Data is transmitted from one side to the other in relatively small packets. The packet contains, in addition to data, control information, including the address of the desired destination. For instance, if the left-hand port 000 desires to send a packet of data to the right-hand port 100, it includes the destination address 100 in the header of the packet and inputs the packet into the switch 20A. The switch 20A looks at the right-most bit of the destination address and, as a result, sends both the destination address and the data part of the packet through its 0 output to switch 20B. The switch 20B, in turn, looks at the middle bit of the destination address, a 0, and routes the packet through its 0 output to switch 20C. The switch 20C looks at the third or left-most bit of the destination address, a 1, and thus routes the packet through its 1 output to the right-hand port 100.

By use of buffers in switches 20, it is possible to decouple the switches of the different sections so that the control and transmission are pipelined between the stages of the 2×2 switches 20. This provides high throughput, but the introduction of the hardware related to buffer control requires additional logic. This, as well as the space required for the buffers, typically leads to a substantial increase in the number of logic gates and chips traversed, thereby increasing transmission latency.

While the Delta network of FIG. 2 can provide parallel transmission paths, thereby increasing the bandwidth of the system, it is a blocking network; that is, there is no guarantee that a connection path is available through a switch even if the desired output port is otherwise available. For instance, if the previously described connection between the 000 port on the left-hand side and the 100 port on the right-hand side is made, the left-hand port 001 is blocked from reaching the four right-hand ports 000, 010, 100, and 110. The previously described connections would need to be broken before the blocking is removed. Thus, the Delta network is potentially fast, but as traffic increases, blocking delays can be expected.

Figure 3:
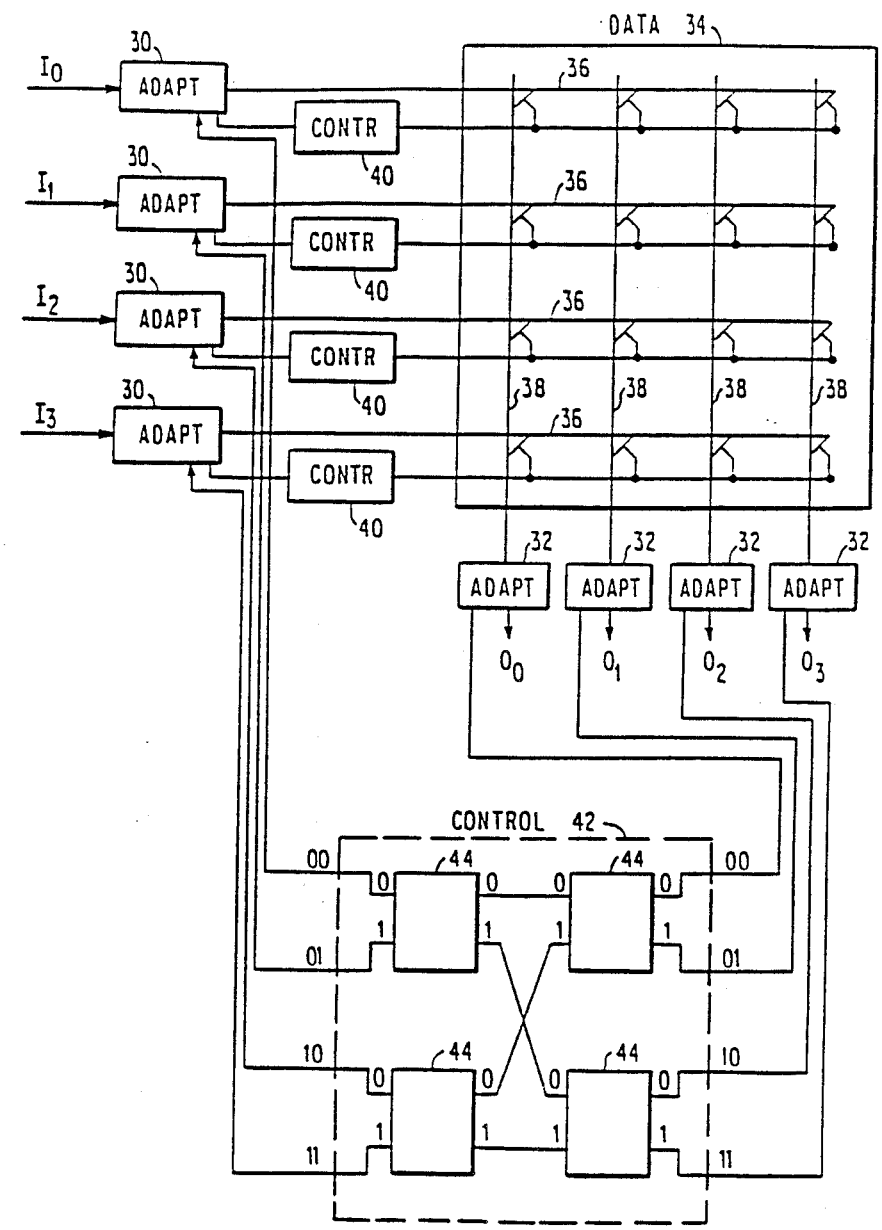
FIG. 3 is a block diagram of a communications network which uses features of a cross-point switch and a Delta network.

The system according to U.S. Pat. No. 4,752,777 is illustrated in FIG. 3. This system combines the features of a cross-point switch and a Delta switching network by providing a non-blocking cross-point switch for data transmission and by additionally providing a Delta network switch for switching control information between the input and output ports of the cross-point switch. In FIG. 3, each input port is connected to a respective input adapter 30 and each output port is connected to and output adapter 32. A cross-point switch 34 has four horizontal lines 36 connected to the input adapters 32. At each intersection of a horizontal line 36 and a vertical line 38 is a cross-point that is individually selectable to make the connection between the respective horizontal line 36 and a vertical line 38. A cross-point controller 40 is associated with each horizontal line 36 to control the cross-points of that horizontal line 36. This arrangement is horizontally partitioned because the controllers are associated with the input ports rather than the output ports. Each cross-point controller 40 is itself controlled by an associated input adapter 30.

The cross-point switch 34 is used primarily for the selective transmission of data while a separate Delta network 42 is used primarily for the selective transmission of control information between input adapters 30 and output adapters 32. For N equal to four, two stages, each with two 2×2 switches 44, are required. The Delta network differs from that of FIG. 2 because each switch 44 has its own buffering and the adapters 30 and 32 also require buffering. The fundamental problem in controlling the cross-point switch 34 is to ascertain whether the desired horizontal line 36 and the vertical line 38 are available. The controller 40 of the horizontally-partitioned cross-point switch is easily able to decide if its associated horizontal line 36 is available, but it is more difficult for the controller 40 to know if the desired vertical line 38 is available or whether another controller 40 has connected a different cross-point to the desired vertical line 38. The Delta network 42 provides the means of obtaining this information.

When the input adapter 30 receives a request from its input port $I_0$-$I_3$ for a connection to a designated output port $O_0$-$O_3$, the input adapter 30 directs this request through the Delta network 42 to the designated output adapter 32. The adapter 32 keeps a record of the use of its associated vertical line 38. The request that the input adapter 30 transmit to the output adapter 32 is in the form of a control message $S^C{ij}$, where i is the number of the input adapter 30 and j is the number of the output adapter 32. A control message $S^R{ij}$ returned to the input adapter 30 from the output adapter 32 provides information as to the time at which the input adapter can initiate the sending of the message to the output adapter. When that time arrives, the input adapter instructs its associated controller 40 to make the cross-point connection (ij) in the cross-point switch 34 and the input adapter 30 then proceeds to send its message. At the same time, the output adapter 32 has prepared itself to receive the message designated by the senior member of the reservation queue.

The use of a crossbar switch in the system described in U.S. Pat. No. 4,752,777 has a disadvantage since crossbars are limited by the fanout characteristics of the technology and by a quadratic growth in hardware complexity. For cases where N is greater than 1000, crossbar switches may not be realizable with current technology. Multistage networks, on the other hand, are structured so that data transmissions must pass through $\log_k N$ sequential network stages. The network stages are connected by point-to-point interconnections, unlike the bus interconnections of crossbar switches and, consequently, are not constrained by the fanout characteristics of the technology. The performance of multistage networks, however, is limited by two other factors, namely data transfer delays between stages and contention resolution delays at each stage.

Figure 4:
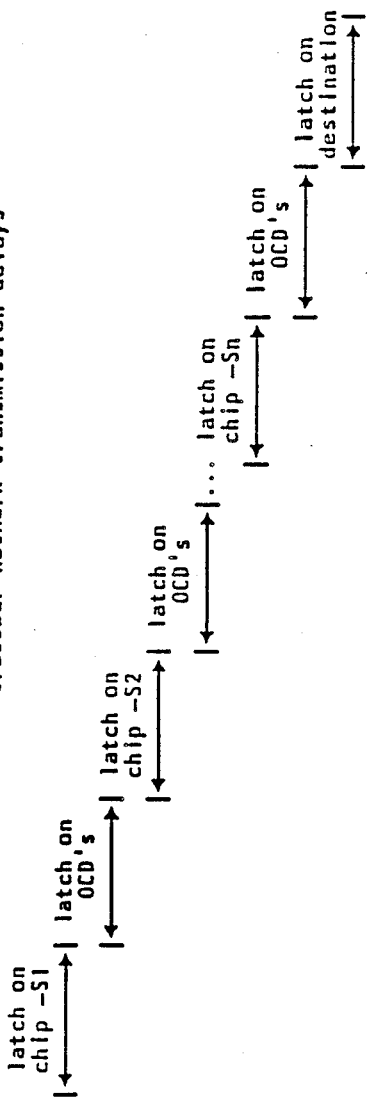
FIG. 4 is a relative timing diagram showing delays in a crossbar switch versus multistage networks.

Data transfer delays between stages can be significant, as the transmission speed of the off-chip data paths is considerably less than that of the on-chip paths (typically by an order of magnitude smaller). This is primarily due to transmission line capacitances and the simultaneous off-chip driver (OCD) switching limitations of chip packages. The multistage networks are affected more severely by these delays than crossbar switches because they have more stages. The timing diagram of FIG. 4 illustrates this point.

The delays introduced at each stage of a multistage network by the need for contention resolution can magnify the in-between-stage transmission delays. In a typical multistage network, a message is routed from a stage to the next, first by the examination of one or more bits in the message header to identify the next stage, and then by a test of that stage to determine whether it is available to receive the message (i.e., it is not blocked). If the receiving stage resides on a separate chip than the sending stage, the contention resolution test may require two-chip crossings which, of course, would add to the network transfer delay. The chip crossings could be minimized by integrating more than one stage on a single chip. The number of stages on a chip could vary, depending on the hardware complexity of a stage.

For multistage networks without store-and-forward capability, multiple stages could be integrated on a single chip, as allowed by the number of chip I/O pins and layout rules of the technology. In such a network, if the next stage is blocked, the message is discarded and a signal is sent to the source to initiate retransmission. If, as is typically the case, the network is not a nonblocking design, retries may result in substantial local increases in apparent traffic, with significant performance degradation.

Multistage networks with buffering, on the other hand, decrease the overall network blocking factor, but at the expense of complexity which limits the number of stages per chip, and this increases the number of chip crossings. Additional delays are incurred for storage operations, as well as contention resolution, which is more complex than in the case without store-and-forward.

Figure 5:
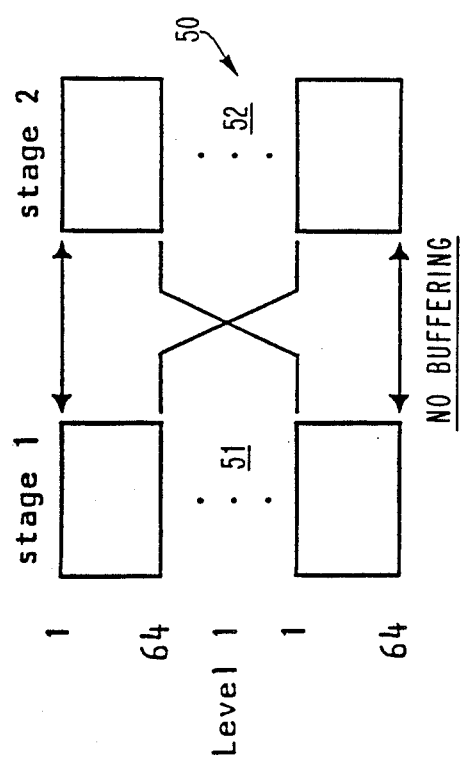
FIG. 5 is a block diagram showing a basic, two level hierarchy multistage network according to the invention.
Figure 5:
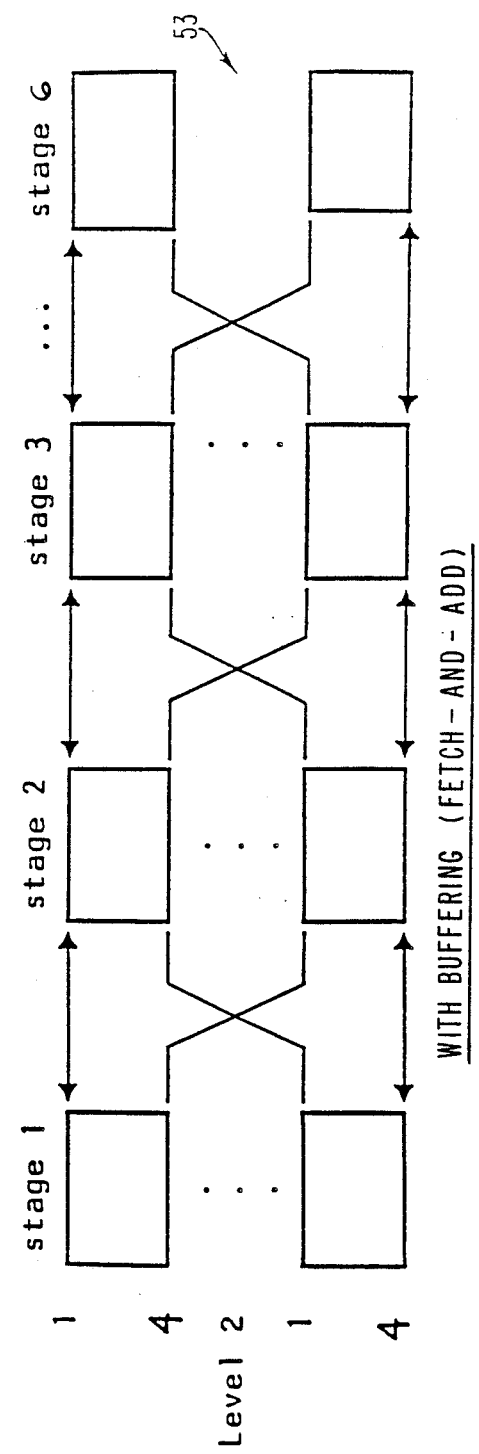

According to the present invention, there is provided a hierarchy of multistage networks, the fast path of which is provided by a network without buffering and with few stages. The basic form of this switching network is illustrated in FIG. 5. Using current technology, k = 64, which means that a network of N = 2000 nodes could be constructed with two stages only. The first or fast path 50 of the network is therefore illustrated as comprising two stages 51 and 52, each composed of a plurality of chips having 64 input and 64 output ports.

A message through the fast path propagates as follows. The first six bits of the address field is used in the first stage to select the appropriate second stage. If the connection to the second stage is available, i.e., non-blocked, the message, with the six address bits stripped off, propagates to the second stage. If, on the other hand, the second stage is blocked, the message propagation is stopped, and a negative acknowledgment is sent to the source, initiating retransmission of the message through the second level 53 of the hierarchy. This second level may, for example, comprise sixteen stages of store-and-forward multipath networks, each stage being composed of a plurality of chips having but four input and four output ports. Because of the store-and-forward capability of the networks in the second level, delivery of the message which may have been blocked in the first level is guaranteed to be delivered, albeit at higher latency.

FIG. 6 shows a further implementation of the invention wherein an intermediate level 60 has been added between level 50 and level 53. The purpose of this intermediate level is to provide a lower latency alternative to the bottom (i.e., guaranteed delivery) level. It could comprise a network identical to the first level, or one simply implemented in a cheaper and slower level of technology. Alternately, it could be a Delta network with a larger number of stages. Finally, the next level 53, with its store-and-forward buffering, guarantees delivery of the message to the destination under all traffic conditions. It should be noted that the buffered network could incorporate combining of operations such as fetch-and-add, as in the above-cited U.S. Pat. No. 4,752,777 to Franaszek.

While the invention has been described in terms of a preferred embodiment, those skilled in the art will recognize that the invention can be practiced with modification within the spirit and scope of the appended claims. For example, there may be two, three or even more levels in the hierarchical network. Moreover, depending on the available technology, the number of input and output ports per multipath network chip may be greater than the current 64.

Having thus described our invention, what we claim as new and desire to secure by Letters Patent is as follows:

1. A hierarchy of multipath networks for selectively interconnecting a plurality of sources and a plurality of destinations in a communication system comprising:
   a first multipath network without buffering and consisting of at least two stages and constituting a fast path for connecting a source to a destination; and
   at least a second multipath network with buffering and comprising a plurality of stages and constituting an alternate, slower path for connecting a source to a destination in the event that a connection between the source and the destination is blocked in said fast path.

2. The hierarchy of multipath networks as recited in claim 1 wherein said first and second multipath networks are delta networks.

3. A hierarchy of multipath networks as recited in claim 1 wherein said second multipath network includes fetch-and-add means.

4. The hierarchy of multipath networks as recited in claim 1 further comprising at least a third, intermediate network interposed between said first and second multipath networks, said third network providing an alternate path for connecting said source and said destination in the event that a connection is blocked in said fast path, said second network providing an alternate, guaranteed connection in the event that a connection is blocked in said third network.

5. The hierarchy of multipath networks as recited in claim 4 wherein said third network is a multipath network without buffering.

6. The hierarchy of multipath networks as recited in claim 5 wherein said first, second and third multipath networks are delta networks.

7. A method of selectively interconnecting a plurality of sources with a plurality of destinations in a communication network comprising the steps of:
   providing a first multipath network without buffering consisting of at least two stages and constituting a fast path for connecting a source to a destination;
   examining an address field of a message from a source at each of said stages to select an appropriate connection to a succeeding stage in said network and, if the connection is available, propagating the message without the address field to a succeeding stage, but if the succeeding stage is blocked, stopping message propagation and returning a negative acknowledgment to the source;
   providing at least a second multipath network with buffering comprising a plurality of stages and constituting an alternate, slower path for connecting a source to a destination in the event that a connection between the source and the destination is blocked in said fast path; and
   initiating retransmission of the message through said second network of the hierarchy upon the receipt of a negative acknowledgment at the source.

8. The method according to claim 7 wherein the first and second multipath networks are delta networks.

9. The method according to claim 7 further comprising the steps of:
   providing a third, intermediate multipath network without buffering interposed between said first and second multipath networks;
   attempting a connection between said source and said destination using said third multipath network in the event that a connection is blocked in said first multipath network; and
   performing said step of initiating in the event that a connection is blocked in said third multipath network, said second multipath network providing a guaranteed connection in the event that a connection is blocked in said third multipath network.

10. The method according to claim 9 wherein the first, second and third multipath networks are delta networks.

* * * * *